(12) United States Patent
Li

(10) Patent No.: US 11,550,516 B2
(45) Date of Patent: Jan. 10, 2023

(54) IMAGE FORMING METHOD WITH IMAGE-FORMING-DATA TRANSMISSION PATH AND NON-TRANSITORY COMPUTER STORAGE MEDIUM

(71) Applicant: Zhuhai Pantum Electronics Co., Ltd., Zhuhai (CN)

(72) Inventor: Jiade Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 3 days.

(21) Appl. No.: 16/877,903

(22) Filed: May 19, 2020

(65) Prior Publication Data

US 2020/0278815 A1 Sep. 3, 2020

Related U.S. Application Data

(63) Continuation of application No. PCT/CN2018/098654, filed on Aug. 3, 2018.

(30) Foreign Application Priority Data

Nov. 21, 2017 (CN) .......................... 201711162725.0

(51) Int. Cl.
*G06F 3/12* (2006.01)
*H04N 1/00* (2006.01)

(52) U.S. Cl.
CPC .......... *G06F 3/1203* (2013.01); *G06F 3/1224* (2013.01); *G06F 3/1236* (2013.01); *H04N 1/00244* (2013.01)

(58) Field of Classification Search
None
See application file for complete search history.

(56) References Cited

U.S. PATENT DOCUMENTS 6,529,286 B1 3/2003 King
9,019,536 B2 * 4/2015 Ohno .................... G06F 3/1288
358/1.15

(Continued)

FOREIGN PATENT DOCUMENTS

CN 102999306 A 3/2013
CN 103312920 A 9/2013

(Continued)

OTHER PUBLICATIONS

The World Intellectual Property Organization (WIPO) International Search Report for PCT/CN2018/098654 Nov. 1, 2018 5 Pages (including translation).

*Primary Examiner* — Paul F Payer
(74) *Attorney, Agent, or Firm* — Anova Law Group, PLLC

(57) ABSTRACT

An image forming method, a terminal, and a non-transitory computer storage medium are provided in the present disclosure. The image forming method is applied to a system including a first client, a second client, a server, and a target image forming device. The method includes registering the target image forming device to the server by the second client, and inputting image forming description information of the target image forming device to the server by the second client, where the image forming description information includes an image forming manner corresponding to an image-forming-data transmission path between the first client and the target image forming device.

20 Claims, 4 Drawing Sheets

(56) References Cited

U.S. PATENT DOCUMENTS

| | | | | |
|---|---|---|---|---|
| 9,063,680 B1* | 6/2015 | Iwasaki | ................ | G06F 3/1238 |
| 9,830,112 B2* | 11/2017 | Sakai | ................... | G06F 3/1204 |
| 10,223,053 B2* | 3/2019 | Kim | ..................... | G06F 3/1257 |

FOREIGN PATENT DOCUMENTS

| CN | 103631540 A | 3/2014 |
|---|---|---|
| CN | 104834489 A | 8/2015 |
| CN | 107885471 A | 4/2018 |

* cited by examiner

The second client registers the target image forming device to a server and input image forming description information of the target image forming device to the server through the second client; and the image forming description information includes the image forming manner corresponding to the image-forming-data transmission path between the first client and the target image forming device 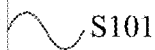 S101

FIG. 1

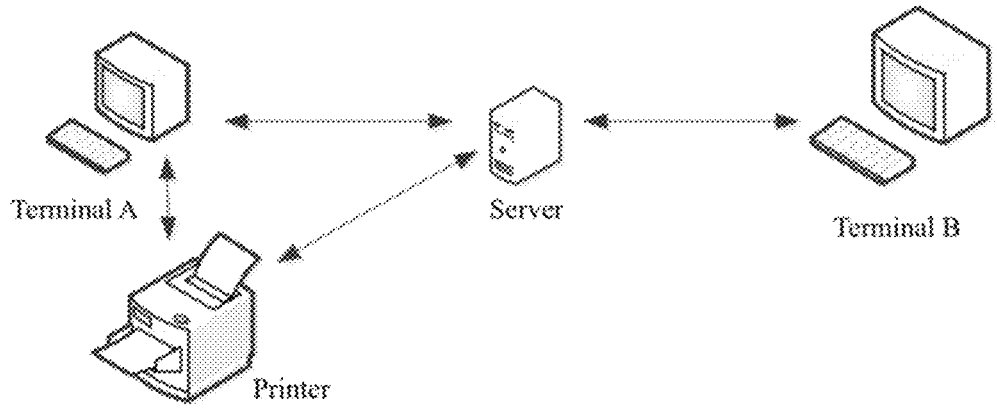

FIG. 3

| | |
|---|---|
| The second client registers the image forming device to the server and input image forming description information of the target image forming device to the server through the second client; and the image forming description information includes the image forming manner corresponding to the image-forming-data transmission path between the first client and the target image forming device | S401 |
| The first client determines the target image forming device and acquires the image forming description information of the target image forming device; and the image forming description information includes the image forming manner corresponding to the image-forming-data transmission path between the first client and the target image forming device | S402 |
| Whether the image forming manner corresponding to the target image forming device meets the requirements is determined; and if the requirements are met, an image forming request is sent at the first client | S403 |
| The target image forming device performs the image forming processing on specified information in response to the image forming request | S404 |

FIG. 4

```
┌─────────────────────────────────────────────────────────┐
│ The target image forming device is determined and the image forming │
│ description information of the target image forming device is acquired; │
│ and the image forming description information includes the image │
│ forming manner corresponding to the image-forming-data           │ ～S501
│ transmission path between the first client and the target image forming │
│                          device                         │
└─────────────────────────────────────────────────────────┘
                              │
                              ▼
┌─────────────────────────────────────────────────────────┐
│   The image forming request is sent based on the image forming  │
│ description information, such that the target image forming device │ ～S502
│ performs image forming processing on the specified information in │
│           response to the image forming request          │
└─────────────────────────────────────────────────────────┘
```

FIG. 5

```
┌─────────────────────────────────────────────────────────┐
│  The image forming description information of the target image  │
│     forming device belonging to a same user as the second client is │
│   acquired; and the image forming description information includes │
│ the image forming manner corresponding to the image-forming-data │ ～S601
│   transmission path between a client other than the second client and │
│             the target image forming device             │
└─────────────────────────────────────────────────────────┘
                              │
                              ▼
┌─────────────────────────────────────────────────────────┐
│  The registration request, carrying the image forming description │ ～S602
│   information, is sent to the server, such that the server stores the │
│            image forming description information          │
└─────────────────────────────────────────────────────────┘
```

FIG. 6

IMAGE FORMING METHOD WITH IMAGE-FORMING-DATA TRANSMISSION PATH AND NON-TRANSITORY COMPUTER STORAGE MEDIUM

CROSS-REFERENCE TO RELATED APPLICATION

This application is a continuation application of PCT Patent Application No. PCT/CN2018/098654, filed on Aug. 3, 2018, which claims the priority of Chinese patent applications No. 201711162725.0, filed on Nov. 21, 2017, the entirety of all of which is incorporated herein by reference.

TECHNICAL FIELD

The present disclosure generally relates to the field of communications and, more particularly, relates to an image forming method, a terminal, and a non-transitory computer storage medium.

BACKGROUND

Currently, computer Internet technology is in a rapid development process. The serious issue of the Internet is that various information and resources of different industries cannot be interconnected and shared because information and resource islands are generated from their own industries which makes information and resource sharing difficult.

In the printer application field, a user (assuming a user A) does not need to own a printer independently because of low printing demand; however, when a printing demand arises at a certain point, the user A may either find a printing shop or purchase a printer for printing, which may cause the user A to not only waste time also increase unnecessary expenses. On the other hand, a user (assuming a user B) owns a printer independently, but the user B usually has low printing demand and the printer has been idled at home. Therefore, the printer cannot be fully utilized, and other users having printing demands cannot be helped.

Furthermore, when the user B wants to share his own printer with other users, the indispensable step is to register the printer with a cloud server. The existing registration method may be cumbersome, and the user B may not control the data transmission manner, used by other users, of the printer belonging to the user B, thereby causing inconvenience to the user B.

When sharing their own image forming devices with other users, not only the owner of the printer, but also the owners of other image forming devices (e.g., facsimile machines and copiers) may not control manners for transmitting data to the image forming devices, which may cause inconvenience to the users.

SUMMARY

One aspect of the present disclosure provides an image forming method, applied to a system including a first client, a second client, a server, and a target image forming device. The method includes registering the target image forming device to the server by the second client and inputting image forming description information of the target image forming device to the server through the second client. The image forming description information includes an image forming manner corresponding to an image-forming-data transmission path between the first client and the target image forming device.

Another aspect of the present disclosure provides a non-transitory computer storage medium, which stores computer executable instructions. The computer executable instructions are configured to determine a target image forming device and acquire image forming description information of the target image forming device. The image forming description information includes an image forming manner corresponding to an image-forming-data transmission path between a client and the target image forming device. The computer executable instructions are further configured to send an image forming request based on the image forming description information, such that the target image forming device performs image forming processing on specified information in response to the image forming request.

Other aspects of the present disclosure can be understood by those skilled in the art in light of the description, the claims, and the drawings of the present disclosure.

BRIEF DESCRIPTION OF THE DRAWINGS

In order to clearly illustrate the technical solutions in the embodiments of the present disclosure, the drawings, which are required to be used in the description of the disclosed embodiments, are briefly described hereinafter. It should be understood that the following drawings are merely some embodiments of the present disclosure and are not to be considered as the scope limitation. Other drawings derived from such drawings may be obtained by those skilled in the art without creative work.

FIG. 1 illustrates an exemplary image forming method according to various embodiments of the present disclosure;

FIG. 3 illustrates another exemplary system of sharing printers according to various embodiments of the present disclosure;

FIG. 4 illustrates another exemplary image forming method according to various embodiments of the present disclosure;

FIG. 5 illustrates another exemplary image forming method according to various embodiments of the present disclosure; and FIG. 6 illustrates another exemplary image forming method according to various embodiments of the present disclosure.

DETAILED DESCRIPTION

Figure 2:
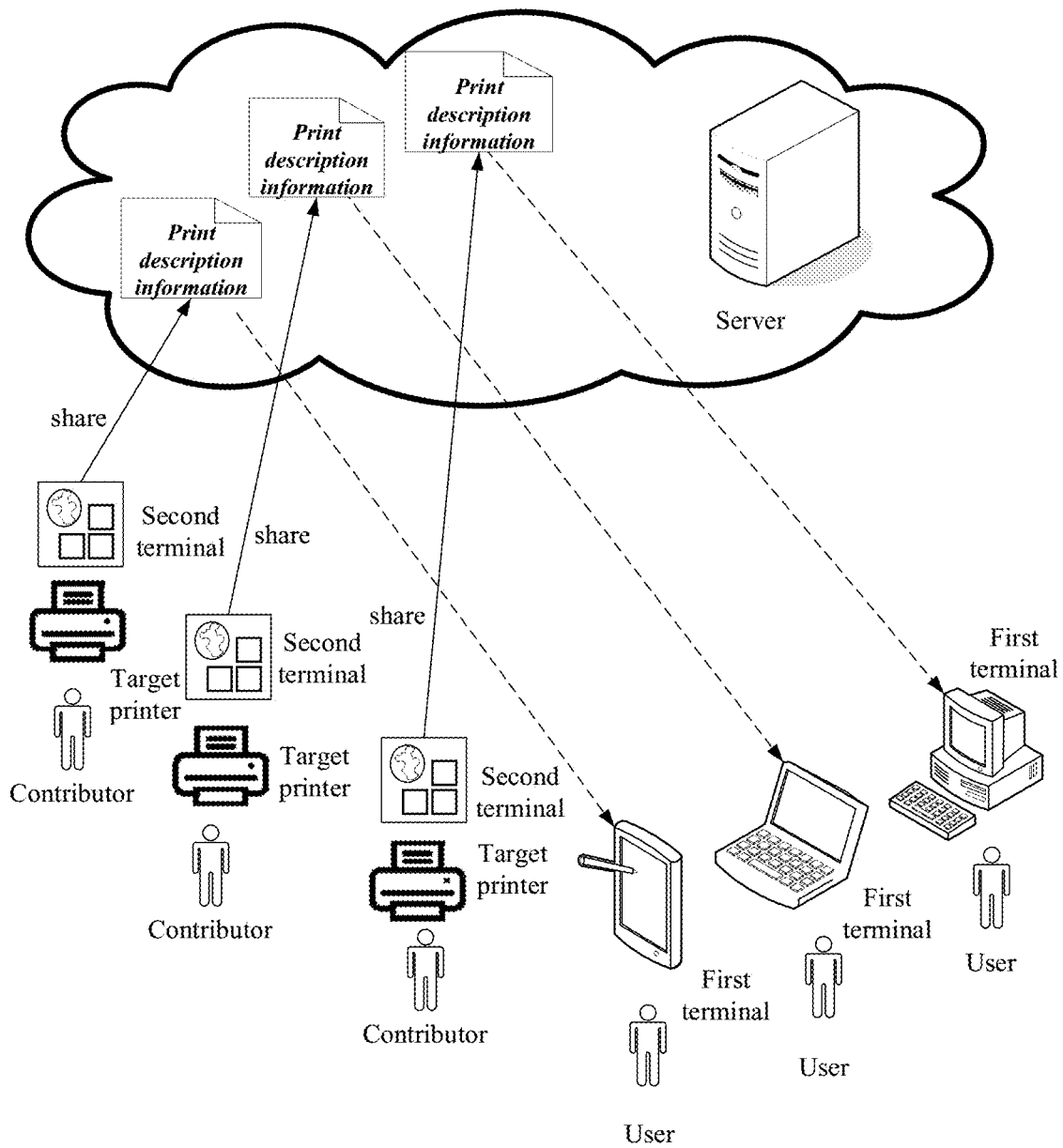
FIG. 2 illustrates an exemplary system of sharing printers according to various embodiments of the present disclosure.

In order to better understand the technical solutions of the present disclosure, the present disclosure is described in detail with reference to the accompanying drawings.

It should be clear that the described embodiments are only a part of the embodiments of the present disclosure, but not all the embodiments. Based on the embodiments in the present disclosure, all other embodiments obtained by those skilled in the art without creative work should fall within the scope of protection of the present application.

Exemplary Embodiment One

FIG. 1 illustrates an exemplary image forming method according to various embodiments of the present disclosure. As shown in FIG. 1, in one embodiment, the image forming method may be applied to a system including a first client, a second client, and a target image forming device, and the method may include the following steps.

At step S101, the second client may register the target image forming device to a server and input image forming description information of the target image forming device to the server through the second client. The image forming description information may include an image forming manner corresponding to the image-forming-data transmission path between the first client and the target image forming device.

The image forming device may be a printer, a copier, a facsimile, or the like.

For example, the second client may register a target printer to the server and input printing description information of the target printer to the server through the second client. The printing description information may include the printing manner corresponding to the printing data transmission path between the first client and the target image forming device. Herein, the printing description information may be one type of the image forming description information, and the printing manner may be one type of the image forming device.

The first client may be any client other than the second client.

The second client may register the target image forming device to the server and may input the image forming description information of the target image forming device to the server. The second client may set the image forming manner corresponding to the data transmission path between other terminal and the image forming device according to its own requirements, which may be beneficial to better control the use of the image forming device to offer convenience to the second client.

Using the image forming method provided in one embodiment, a contributor (referred to as a user who provides a personal image forming device at any time and at any place, corresponding to the second client) may register the personal image forming device as the target image forming device to the server, which may be used by a user (referred to as a user who has image forming processing demands at any time and at any place, corresponding to the first client) The user may select a corresponding target image forming device to perform image forming processing based on the image forming description information.

Taking a shared printer as an example, FIG. 2 illustrates an exemplary system of sharing printers according to various embodiments of the present disclosure. Referring to FIG. 2, each contributor may use the own personal printer as the target printer, register the target printer to the server through the second client installed on the second terminal belonging to the contributor, and input the printing description information of the target printer to the server through the second client. The printing description information may include the printing manner corresponding to the printing data transmission path between the first client and the target printer. The user may obtain the printing description information of the target printer from the server through the first client installed on the first terminal belonging to the user. Therefore, the corresponding target printer may be selected for use according to the printing description information, thereby implement the printer sharing.

Furthermore, the registration of the target image forming device to the cloud server through the second client may be implemented by publishing the image forming description information. The required cumbersome operations, such as establishing the connection between the terminal and the image forming device, installing the driver corresponding to the image forming device on the terminal, and then entering the binding setting of the image forming device and the like, may not be needed when the image forming device is conventionally bound to the server, which may offer convenience to the clients.

For example, the registration of the target printing device to the cloud server through the second client may be implemented by publishing the printing description information. The required cumbersome operations, such as establishing the connection between the terminal and the printing device, installing the driver corresponding to the printing device on the terminal, and then entering the binding setting of the printing device and the like, may not be needed when the printing device is conventionally bound to the server, which may offer convenience to the clients.

The first terminal may be a PC, a notebook computer, a tablet computer, or the like. Similarly, the second terminal may be a PC, a notebook computer, a tablet computer, or the like.

It should be noted that a same terminal may be both the first terminal and the second terminal. Therefore, the first client and the second client may be installed simultaneously on the same terminal.

The server may be the cloud server. The contributor may register a cloud printing account through the second client and log into the server through the cloud printing account.

In the image forming description information, the contributor may set whether a shared target image forming device is restricted from external disclosure for different regions, usage, and groups of people. The contributor may also set conditions, such as whether a shared target image forming device is online or offline, processing time (e.g., printing time), service prices, and the like.

It should be noted that the first client and the second client may be combined into one client, that is, the first client and the second client may be a same application program. For example, the first client and the second client may be different usage modes in a same application program, such that there is no need to install a plurality of clients, thereby offering convenience to the users.

The example, where the first client and the second client are different usage modes in a same application program, may be used to illustrate how the user performs operation through the client hereinafter.

Taking a printer as an example, a user may firstly choose whether to install the client application on a PC terminal or mobile terminal, or directly use a browser as the client.

After the user run the client and register a cloud printing account, the user may perform server login authentication by inputting the cloud printing account number and login password.

After the user login authentication is successful and the user may enter the user operation interface. The default interface of the client may be the user interface corresponding to the user mode or the contributor interface corresponding to the contributor mode. The user may switch between the user interface and the contributor interface according to the user's requirements.

The client may intelligently switch user types and permissions according to the mode selected by the user.

For example, when the user selects the user mode, the user type may be intelligently switched to the printer user type, and only relevant permissions of the printer user mode and interface are available. For example, the permissions may be searching for shared printers, binding shared printers, querying the statuses of bound shared printers, publishing printing jobs, managing printing jobs, querying printing jobs, and the like.

When the user selects the contributor mode, the user type may be intelligently switched to the printer contributor type, and only relevant permissions of the printer contributor mode and interface are available. For example, the permissions may be registering and publishing shared printers, managing shared printers which are registered and published, querying the statuses of shared printers which are registered and published, managing printing jobs received by shared printers, managing shared printer permissions, managing users bound to shared printers, and the like.

If the user login authentication fails, the user may not enter the user operation interface. At this point, the client may prompt the user of the failure of the login authentication by displaying the prompt message.

The client may intelligently switch user types and permissions according to the mode selected by the user, which may offer convenience to the user. How the contributors share their own printers are described with reference to FIG. 3 hereinafter. FIG. 3 illustrates another exemplary system of sharing printers according to various embodiments of the present disclosure. Referring to FIG. 3, a terminal A may belong to a printer contributor a, a printer may belong to the printer of the contributor a. When the user is the printer contributor, the user may log into the server through the terminal A and enter the contributor interface. The contributor a may, through the terminal A manually and/or by relying on the application program installed on the terminal A, automatically obtain the relevant information of the printer, and fill and publish the printing description information including printer capability information, IP address, charging or not, and the like, or the IP address of the terminal A and the printing manner supported by the shared printer. The printing capability information such as printing speed, printing status, black-and-white/color printing mode, remaining toner amount, and the like, which are considered by those skilled in the art and obtained through the application installed in the terminal A, may be determined without user's participation. Other information which cannot be obtained by communicating with the printer may be determined by the contributor through manual inputting. The IP address of the terminal A may be used to establish a connection between the server or other terminal and the terminal A or the printer of the terminal A. Based on the printing description information published by the contributor a, the server may automatically store the cloud server account of the user a, the IP address of the printer of the user a, and the IP address of the terminal A in association with each other, thereby implementing the operation of binding the printer of the user a to the server. In FIG. 3, the terminal B may belong to the printer user b. When the user is a printer user, the user may log into the server through the terminal B and enter the user interface. The user b may, through the client on the terminal B, may obtain the usable printer information and the printing description information of the available printer from the server.

FIG. 4 illustrates another exemplary image forming method according to various embodiments of the present disclosure. As shown in FIG. 4, in one embodiment, the image forming method may be applied to a system including a first client, a second client, a server, and a target image forming device, and the method may include the following steps.

At S401, the second client may register the image forming device to the server and input image forming description information of the target image forming device to the server through the second client. The image forming description information may include the image forming manner corresponding to the image-forming-data transmission path between the first client and the target image forming device.

At S402, the first client may determine the target image forming device and acquire the image forming description information of the target image forming device. The image forming description information may include the image forming manner corresponding to the image-forming-data transmission path between the first client and the target image forming device.

At S403, whether the image forming manner corresponding to the target image forming device meets the requirements may be determined; and if the requirements are met, an image forming request may be sent at the first client.

At S404, the target image forming device may perform the image forming processing on specified information in response to the image forming request.

Taking the printer as an example, the image forming method of the printer may include the following steps.

The second client may register the printer to the server, and may input printing description information of the target printer to the server through the second client. The printing description information may include the printing manner corresponding to the printing data transmission path between the first client and the target printer.

The first client may determine the target printer and acquire the printing description information of the target printer. The printing description information may include the printing manner corresponding to the printing data transmission path between the first client and the target printer.

Whether the printing manner corresponding to the target printer meets the requirements may be determined; and if the requirements are met, a printing request may be sent at the first client.

The target printer may perform printing on specified information in response to the printing request.

In an exemplary implementation process, the image forming manner corresponding to the image-forming-data transmission path between the first client and the target image forming device may include directly transmitting the image-forming-data to the target image forming device; and/or transmitting the image-forming-data to the server by the first client and forwarding the image-forming-data to the target image forming device by the server; and/or transmitting the image-forming-data to the second client by the first client and forwarding the image-forming-data to the target image forming device by the second client; and/or transmitting the image-forming-data to the server by the first client, forwarding the image-forming-data to the second client by the server, and then forwarding the image-forming-data to the target image forming device by the second client. After the second client registers the target image forming device to the server, other clients other than the second client may acquire available image forming device information through the server, such that other image forming devices may be utilized to perform image forming processing. Therefore, the simultaneous utilization of a same image forming device by a plurality of clients may be implemented, which may improve the utilization rate of the image forming device and reduce the waste of resources.

Furthermore, the server may only include the image forming description information of the target image forming device; or only include the association relationship between the second user corresponding to the second client and the target image forming device, and the image forming description information of the target image forming device, excluding the following information: the association relationship between the first client and the second client, the association relationship between the first client or the first user corresponding to the first client and the target image forming device, and the association relationship between the first user corresponding to the first client and the second user corresponding to the second client.

The association relationship between the first user and the second user may be the association relationship between the login account of the first user on the server and the cloud server account of the second user.

The association relationship between the second user and the target image forming device may be the association relationship between the login account of the second user on the server and the target image forming device.

In one embodiment, since there is no need to store the above-mentioned association relationship, the first user may utilize the image forming description information of the target image forming device of the second user to determine the target image forming device to be used, and then utilize the target image forming device to perform connection according to the image forming method determined by the second user, that is, the owner of the target image forming device. For the existing technology, the second user is bound to the target image forming device, and then the association relationship between the first user and the second user is stored on the server. That is, the second user authorizes the first user to use the image forming device bound to the second user and then allows the first user to use the image forming device bound to the second user. Compared with the existing technology, the technical solutions provided by the embodiments of the present disclosure may be more convenient, which may simplify the user operations.

Correspondingly, in an exemplary implementation process, sending the image forming request at the first client may include: sending the first image forming request to the server from the first client; in response to the received first image forming request, generating a second image forming request by the server and sending the second image forming request to the second client; in response to the received second image forming request, generating a third image forming request by the second client and sending the third image forming request to the target image forming device, such that the target image forming device may extract the specified information from the third image forming request. In one embodiment, the first client may send the image forming request to the target image forming device through the server and the second client.

In an exemplary implementation process, sending the image forming request at the first client may include: sending the first image forming request to the server from the first client; in response to the received first image forming request, generating a fourth image forming request by the server and sending the fourth image forming request to the target image forming device, such that the target image forming device may extract the specified information from the fourth image forming request. In one embodiment, the first client may send the image forming request to the target image forming device through the server without passing through the second client, that is, even if the second client does not establish the connection with the image forming device, the image forming processing operation may still be completed, which may offer convenience to the users.

In an exemplary implementation process, the image forming description information may include the first IP address corresponding to the image forming device; sending the image forming request at the first client may include acquiring the first IP address corresponding to the target image forming device from the image forming description information by the first client, and sending a fifth image forming request to the target image forming device according to the first IP address by the first client, such that the target image forming device may extract the specified information from the fifth image forming request. In one embodiment, the first client may directly send the image forming request to the target image forming device without passing through the server and the second client, which may reduce the security risk of the interception of the image-forming-data; and even if the second client does not establish the connection with the image forming device or the Internet, the image forming processing operation may still be completed, which may offer convenience to the users.

In an exemplary implementation process, the image forming description information may include the second IP address corresponding to the image forming device and the second client, and the second client may belong to the second user. Sending the image forming request at the first client may include acquiring the second IP address corresponding to the second client from the image forming description information by the first client, sending a sixth image forming request to the second client according to the second IP address by the first client, and sending a seventh image forming request to the target image forming device in response to the received sixth image forming request, such that the target image forming device may extract the specified information from the seventh image forming request. In such manner, the image forming processing operation may be completed only if the second client establishes the connection with the target image forming device, which may be beneficial for the user of the second client to control the use of the image forming device and may offer convenience to the second client.

In an exemplary implementation process, the image forming method may further include logging into the cloud server based on the cloud server account by the second client corresponding to the target image forming device and determining the image forming description information of the target image forming device; based on the determined image forming description information of the target image forming device, sending the registration request to the server by the second client, the registration request carrying the image forming description information; and binding the target image forming device to the cloud server account of the second client and storing the image forming description information by the server.

In the image forming method of the embodiments of the present disclosure, the target image forming device may be registered to the server through the second client, and the image forming description information of the target image forming device may be inputted to the server through the second client; the image forming description information may include the image forming manner corresponding to the image-forming-data transmission path between the first client and the target image forming device; and the binding of the image forming device to the cloud server may be implemented by publishing the image forming description information. There is no need to establish the connection between the image forming device and the client, and also no need to install the driver corresponding to the image forming device on the terminal, which is different from the conventional binding the image forming device to the server, including the required cumbersome operations, such as establishing the connection between the terminal and the image forming device, installing the driver corresponding to the image forming device on the terminal, and binding setting of the image forming device and the like. Therefore, the operation of binding the image forming device to the cloud server by publishing the image forming description information may offer convenience to the contributor of the image forming device.

Exemplary Embodiment Two

The embodiment of the present disclosure provides the image forming method, which may be implemented by a client application program installed on the terminal such as a PC terminal, a mobile terminal (e.g., a mobile phone, or a tablet computer), or may also be implemented by the code integrated in a browser (e.g., an IE browser).

FIG. 5 illustrates another exemplary image forming method according to various embodiments of the present disclosure. As shown in FIG. 5, in one embodiment, the image forming method may be executed at the first client, and the method may include the following steps.

At S501, the target image forming device may be determined and the image forming description information of the target image forming device may be acquired. The image forming description information may include the image forming manner corresponding to the image-forming-data transmission path between the first client and the target image forming device.

At S502, the image forming request may be sent based on the image forming description information, such that the target image forming device may perform image forming processing on the specified information in response to the image forming request.

The user of the image forming device, through one embodiment, may utilize the shared target image forming device provided by the image forming device contributor to perform the image forming processing, thereby improving the utilization rate of the image forming device and reducing the waste of resources. For example, the printer user may utilize the shared target printer provided by the printer contributor to perform the image forming processing, thereby improving the utilization rate of the printer and reducing the waste of resources.

In an exemplary implementation process, sending the image forming request based on the image forming description information may include: sending the first image forming request to the server, such that the server may respond to the received first image forming request; sending the second image forming request to the second client corresponding to the target image forming device, such that the second client may respond to the received second image forming request; sending the third image forming request to the target image forming device, or sending the fourth image forming request to the target image forming device in response to the received first image forming request. In one embodiment, the client may be the first client in the above-mentioned exemplary embodiment one. In one embodiment, the user may utilize the first client to send the image forming request to the target image forming device through the server and the second client. For the user of the image forming device, the user may only need to select the target image forming device in the user interface of the server, may not need to consider information, such as the IP addresses of the second client and the target image forming device and the like, for the image forming processing transmitted to the target image forming device from the image-forming-data. The operation difficulty of the user may be reduced in one embodiment.

In an exemplary implementation process, the image forming description information may include the first IP address corresponding to the image forming device; and sending the image forming request based on the image forming description information may include acquiring the first IP address corresponding to the target image forming device and sending the fifth image forming request to the target image forming device according to the first IP address. In one embodiment, the client may be the first client in the above-mentioned exemplary embodiment one. In one embodiment, the user may directly send the image forming request to the target image forming device through the first client according to the first IP address corresponding to the target image forming device. Since the image-forming-data in the embodiment does not need to be transmitted to other devices such as servers, terminals and the like, the risk of the image-forming-data being intercepted may be reduced to a certain extent, thereby ensuring the data security; and the transmission path of the image forming request does not need to be affected by factors such as whether the server or other terminals are online, such that the possibility of successful data transmission may be high to certain extent, the use of the image forming device may not be affected even if the client, belonging to a same user as the image forming device, is offline, and the transmission path of the image forming request may be the shortest, thereby improving the processing speed of the image forming process in one embodiment.

In an exemplary implementation process, the image forming description information may include the second IP address corresponding to the second client which corresponds to the image forming device and belongs to the second user. Sending the image forming request based on the image forming description information may include acquiring the second IP address corresponding to the second client and sending the sixth image forming request to the second client according to the second IP address, such that the second client may generate a seventh image forming request in response to the received sixth image forming request and send the seventh image forming request to the target image forming device. In one embodiment, the client may be the first client in the above-mentioned exemplary embodiment one. In one embodiment, the user may send the image forming request to the target image forming device through the second client using the first client according to the second IP address corresponding to the second client.

In the image forming method of the embodiments of the present disclosure, by determining the target image forming device and acquiring the image forming description information of the target image forming device, the image forming description information may include the image forming manner corresponding to the image-forming-data transmission path between the first client and the target image forming device; the image forming request may be sent based on the image forming description information, such that the target image forming device may perform the image forming processing on specified information in response to the image forming request. Therefore, the user may be able to send the image forming request to the target image forming devices belonging to other users through the image forming description information of the target image forming devices belonging to other users to implement the image forming process, thereby implementing the sharing of the image forming devices of other users, improving the utilization rate of the image forming devices, and reducing the resource waste of the image forming device.

Exemplary Embodiment Three

The embodiment of the present disclosure provides the image forming method, which may be implemented by a client application program installed on the terminal such as a PC terminal, a mobile terminal (e.g., a mobile phone, or a tablet computer), or may also be implemented by the code integrated in a browser (e.g., an IE browser).

FIG. 6 illustrates another exemplary image forming method according to various embodiments of the present disclosure. As shown in FIG. 6, in one embodiment, the image forming method may be executed at the second client, and the method may include the following steps.

At S601, the image forming description information of the target image forming device belonging to a same user as the second client may be acquired. The image forming description information may include the image forming manner corresponding to the image-forming-data transmission path between a client other than the second client and the target image forming device.

At S602, the registration request, carrying the image forming description information, may be sent to the server, such that the server may store the image forming description information.

The image forming description information may further include at least one of the first IP address corresponding to the target image forming device, the second IP address corresponding to the second client, the service price, the service region, the purpose, and the range of available personnel corresponding to the second client.

In an exemplary implementation process, the image forming method may further include receiving an eighth image forming request sent by another client or server, generating a ninth image forming request based on the eighth image forming request, and sending the ninth image forming request to the target image forming device. In one embodiment, the client may be the second client in the above-mentioned exemplary embodiment one. The contributor of the image forming device may utilize the client to facilitate other clients or servers to forward the image forming request to their own target image forming devices, thereby implementing the sharing of the image forming device resources.

In an exemplary implementation process, the image forming method may further include acquiring the image forming description information of the target image forming device belonging to a same user as the second client, and the image forming description information may include the image forming manner corresponding to the image-forming-data transmission path between a client other than the second client and the target image forming device; and sending the registration request to the server, the registration request carrying the image forming description information, such that the server may store the image forming description information. In one embodiment, the client may be the second client in the above-mentioned exemplary embodiment one. The contributor of the image forming device may utilize the second client to register the target image forming device belonging to a same user as the second client to the server.

In an exemplary implementation process, the image forming description information may include at least one of the first IP address corresponding to the target image forming device, the second IP address corresponding to the second client, the service price, the service region, the purpose, and the range of available personnel corresponding to the second client.

In the image forming method of the embodiments of the present disclosure, by acquiring the image forming description information of the target image forming device belonging to a same user as the second client, the image forming description information may include the image forming manner corresponding to the image-forming-data transmission path between a client other than the second client and the image forming device; the registration request may carry the image forming description information and may be sent to the server, such that the server may store the image forming description information. In such way, the second client may be able to share its own image forming device with users other than the second client, thereby improving the utilization rate of the image forming device and reducing the resource waste of the image forming device.

Exemplary Embodiment Four

The embodiment of the present disclosure provides a terminal which may include a processor and a memory for storing processor executable instructions. The processor may be configured to determine the target image forming device and acquire the image forming description information of the target image forming device. The image forming description information may include the image forming manner corresponding to the image-forming-data transmission path between the first client and the target image forming device. The processor may further be configured to send the image forming request based on the image forming description information, such that the target image forming device may perform the image forming processing on specified information in response to the image forming request.

In an exemplary implementation process, the processor may further be configured to: send the first image forming request to the server, such that the server may respond to the received first image forming request; send the second image forming request to the second client corresponding to the target image forming device, such that the second client may respond to the received second image forming request; send the third image forming request to the target image forming device, or send the fourth image forming request to the target image forming device in response to the received first image forming request.

In an exemplary implementation process, the processor may further be configured to acquire the first IP address corresponding to the target image forming device and send the fifth image forming request to the target image forming device according to the first IP address.

In an exemplary implementation process, the processor may further be configured to acquire the second IP address corresponding to the second client and send the sixth image forming request to the second client according to the second IP address, such that the second client may generate the seventh image forming request in response to the received sixth image forming request and send the seventh image forming request to the target image forming device.

The terminal may be a PC, a notebook computer, a tablet computer, or the like.

Exemplary Embodiment Five

The embodiment of the present disclosure provides a non-transitory computer storage medium which may store computer executable instructions. The computer executable instructions may be configured to determine the target image forming device and acquire the image forming description information of the target image forming device. The image forming description information may include the image forming manner corresponding to the image-forming-data transmission path between the first client and the target image forming device. The processor may further be configured to send the image forming request based on the image forming description information, such that the target image forming device may perform the image forming processing on specified information in response to the image forming request.

Those skilled in the art may clearly understand that for the convenience and conciseness of the description, the specific working process of the system, device and module described above may refer to the corresponding process in the above-mentioned method embodiments, which may not be described in detail herein.

In the multiple embodiments provided in the present disclosure, it should be understood that the disclosed system, device, and method may be implemented in other manners. For example, the above-mentioned device embodiments may merely be illustrative; the division of the modules may be merely a division of logical functions, and there may be other divisions in actual implementation. For example, multiple modules or components may be combined or integrated into another system, or some features may be ignored or may not be implemented. Furthermore, the displayed or discussed mutual coupling, direct coupling or communication connection may be indirect coupling or communication connection through certain interfaces, devices or modules, and may be in electrical, mechanical, or other forms.

The modules described as separate components may or may not be physically separated. The components as module displays may or may not be physical modules, that is, may be located in one place or may be distributed on multiple network elements. Certain or all of the modules may be selected according to actual needs to achieve the purpose of the solution of this embodiment.

Furthermore, the functional modules in the embodiments of the present disclosure may be integrated into one processing unit, or each module may exist separately and physically, or two or more modules may be integrated into one unit. The above-mentioned integrated unit may be implemented in the form of hardware, or in the form of hardware and software functional units.

The above-mentioned integrated unit implemented in the form of a software functional unit may be stored in a computer-readable storage medium. The above-mentioned software functional unit may be stored in a storage medium, and include multiple instructions to enable a computer device (which may be a personal computer, a server, or a network device, and the like) or a processor to perform partial steps of the methods described in the embodiments of the present disclosure. The above-mentioned storage media may include a U disk, a mobile hard disk, a read-only memory (ROM), a random-access memory (RAM), a magnetic disk or an optical disk, and other media which may store program code.

Compared with the existing technologies, the embodiments provided by the present disclosure may achieve at least the following beneficial effects.

In the embodiment of the present disclosure, the target image forming device may be registered to the server by the second client, and the image forming description information of the target image forming device may be inputted to the server through the second client. The image forming description information includes the image forming manner corresponding to the image-forming-data transmission path between the first client and the target image forming device. For the second client, the second client may set the image forming manner corresponding to the data transmission path between other terminal and the image forming device according to its own needs, which is beneficial to better control the use of the image forming device, thereby offering convenience to the second client.

Furthermore, after the second client registers the target image forming device to the server, other clients other than the second client may acquire available image forming device information through the server, such that another image forming device may be utilized to perform image forming processing. Therefore, the simultaneous utilization of a same image forming device by a plurality of clients may be implemented, which may improve the utilization rate of the image forming device and reduce the waste of resources.

Furthermore, the registration of the target image forming device to the cloud server through the second client may be implemented by publishing the image forming description information. The required cumbersome operations, such as establishing the connection between the terminal and the image forming device, installing the driver corresponding to the image forming device on the terminal, and then entering the binding setting of the image forming device and the like, may not be required when the image forming device is conventionally bound to the server, which may offer convenience to the clients.

The above may merely the preferred embodiments of the present disclosure and may not be intended to limit the present disclosure. Any modification, equivalent replacement, improvement and the like within the spirit and principle of the present disclosure shall be included in the scope of protection of this application.

What is claimed is:

1. An image forming method, applied to a system including a first client, a second client, a server, and a target image forming device, the method comprising:
   registering, by the second client, the target image forming device to the server, and directly inputting, by the second client, image forming description information of the target image forming device to the server, wherein the image forming description information includes an image forming manner corresponding to an image-forming-data transmission path between the first client and the target image forming device, the image forming manner is corresponding to the image-forming-data transmission path of available image-forming-data transmission paths, a number of the available image-forming-data transmission paths between the first client and the target image forming device is greater than one, and based on the image forming description information, the first client is able to directly use the target image forming device remotely.

2. The method according to claim 1, further including:
   determining the target image forming device by the first client and acquiring the image forming description information of the target image forming device, wherein the image forming description information includes the image forming manner corresponding to the image-forming-data transmission path between the first client and the target image forming device;
   determining whether the image forming manner corresponding to the target image forming device meets requirements, and sending an image forming request at the first client if the requirements are met; and in response to the image forming request, performing image forming processing on specified information by the target image forming device.

3. The method according to claim 2, sending the image forming request at the first client includes:
sending a first image forming request to the server from the first client;
in response to a received first image forming request, generating a second image forming request by the server and sending the second image forming request to the second client; and
in response to a received second image forming request, generating a third image forming request by the second client and sending the third image forming request to the target image forming device, such that the target image forming device extracts the specified information from the third image forming request.

4. The method according to claim 2, sending the image forming request at the first client includes:
sending a first image forming request to the server from the first client; in response to a received first image forming request, generating a fourth image forming request by the server and sending the fourth image forming request to the target image forming device, such that the target image forming device extracts the specified information from the fourth image forming request.

5. The method according to claim 2, sending the image forming request at the first client includes:
acquiring a first IP address corresponding to the target image forming device from the image forming description information by the first client; and
sending a fifth image forming request to the target image forming device according to the first IP address by the first client, such that the target image forming device extracts the specified information from the fifth image forming request.

6. The method according to claim 2, sending the image forming request at the first client includes:
acquiring a second IP address corresponding to the second client from the image forming description information by the first client;
sending a sixth image forming request to the second client according to the second IP address by the first client; and
in response to a received sixth image forming request, sending a seventh image forming request to the target image forming device by the second client, such that the target image forming device extracts the specified information from the seventh image forming request.

7. The method according to claim 1, the image forming manner corresponding to the image-forming-data transmission path between the first client and the target image forming device includes:
directly transmitting image-forming-data to the target image forming device by the first client; and/or
transmitting the image-forming-data to the server by the first client and forwarding the image-forming-data to the target image forming device by the server; and/or
transmitting the image-forming-data to the second client by the first client and forwarding the image-forming-data to the target image forming device by the second client; and/or
transmitting the image-forming-data to the server by the first client, forwarding the image-forming-data to the second client by the server, and forwarding the image-forming-data to the target image forming device by the second client.

8. The method according to claim 1, further including:
based on a cloud server account, logging into a cloud server by the second client corresponding to the target image forming device and determining the image forming description information of the target image forming device, wherein the image forming description information includes an image forming manner corresponding to an image-forming-data transmission path between a client other than the second client and the target image forming device;
based on determined image forming description information of the target image forming device, sending a registration request to the server by the second client, wherein the registration request carries the image forming description information; and
binding the target image forming device to the cloud server account of the second client and storing the image forming description information by the server.

9. The method according to claim 1, wherein:
the image forming description information further includes at least one of a first IP address corresponding to the target image forming device, a second IP address corresponding to the second client, a service price, a service region, a purpose, and a range of available personnel corresponding to the second client.

10. The method according to claim 1, wherein:
information stored in the server only includes the image forming description information of the target image forming device.

11. The method according to claim 1, wherein:
information stored in the server only includes the image forming description information of the target image forming device and an association relationship between the target image forming device and a second user corresponding to the second client.

12. A non-transitory computer storage medium, storing computer executable instructions, wherein, when the computer executable instructions being executed, the computer is configured to:
determine a target image forming device and acquire image forming description information of the target image forming device directly inputted by a second client, wherein the image forming description information includes an image forming manner corresponding to an image-forming-data transmission path between a first client and the target image forming device, the image forming manner is corresponding to the image-forming-data transmission path of available image-forming-data transmission paths, a number of the available image-forming-data transmission paths between the first client and the target image forming device is greater than one, and based on the image forming description information, the first client is able to directly use the target image forming device remotely; and
send an image forming request based on the image forming description information, such that the target image forming device performs image forming processing on specified information in response to the image forming request.

13. The non-transitory computer storage medium according to claim 12, wherein the computer is further configured to:

determine whether the image forming manner corresponding to the target image forming device meets requirements, and send the image forming request at the first client if the requirements are met; and in response to the image forming request, perform image forming processing on the specified information by the target image forming device.

14. The non-transitory computer storage medium according to claim 12, wherein the computer is further configured to: directly transmit image-forming-data to the target image forming device by the first client; and/or transmit the image-forming-data to a server by the first client and forward the image-forming-data to the target image forming device by the server; and/or transmit the image-forming-data to the second client by the first client and forward the image-forming-data to the target image forming device by the second client; and/or transmit the image-forming-data to the server by the first client, forward the image-forming-data to the second client by the server, and forward the image-forming-data to the target image forming device by the second client.

15. The non-transitory computer storage medium according to claim 12, wherein the computer is further configured to:

send a first image forming request to a server from the first client;

in response to a received first image forming request, generate a second image forming request by the server and send the second image forming request to the second client; and in response to a received second image forming request, generate a third image forming request by the second client and send the third image forming request to the target image forming device, such that the target image forming device extracts the specified information from the third image forming request.

16. The non-transitory computer storage medium according to claim 12, wherein the computer is further configured to:

send a first image forming request to a server from the first client; in response to a received first image forming request, generate a fourth image forming request by the server and send the fourth image forming request to the target image forming device, such that the target image forming device extracts the specified information from the fourth image forming request.

17. The non-transitory computer storage medium according to claim 12, wherein the computer is further configured to:

acquire a first IP address corresponding to the target image forming device from the image forming description information by the first client; and send a fifth image forming request to the target image forming device according to the first IP address by the first client, such that the target image forming device extracts the specified information from the fifth image forming request.

18. The non-transitory computer storage medium according to claim 12, wherein the computer is further configured to:

acquire a second IP address corresponding to the second client from the image forming description information by the first client;

send a sixth image forming request to the second client according to the second IP address by the first client; and in response to a received sixth image forming request, send a seventh image forming request to the target image forming device by the second client, such that the target image forming device extracts the specified information from the seventh image forming request.

19. The non-transitory computer storage medium according to claim 12, wherein the computer is further configured to:

acquire the image forming description information of the target image forming device from a server, wherein information stored in the server only includes the image forming description information of the target image forming device.

20. The non-transitory computer storage medium according to claim 12, wherein the computer is further configured to:

acquire the image forming description information of the target image forming device from a server, wherein information stored in the server only includes the image forming description information of the target image forming device and an association relationship between the target image forming device and a second user corresponding to the second client.

* * * * *